United States Patent
Deng et al.

(10) Patent No.: US 8,978,893 B2
(45) Date of Patent: Mar. 17, 2015

(54) ADDING A COMPLIMENT TO A USER'S EXPERIENCE ON A USER'S SOCIAL NETWORKING PROFILE

(75) Inventors: Peter Deng, Mountain View, CA (US); William Joseph Flynn, III, San Francisco, CA (US); Josh Wiseman, San Francisco, CA (US); Mark E. Zuckerberg, Palo Alto, CA (US); Matthew Cahill, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 741 days.

(21) Appl. No.: 12/980,226

(22) Filed: Dec. 28, 2010

(65) Prior Publication Data

US 2012/0166535 A1    Jun. 28, 2012

(51) Int. Cl.
*G06F 13/00*    (2006.01)
*G06Q 50/00*    (2012.01)

(52) U.S. Cl.
CPC ...................................... *G06Q 50/01* (2013.01)
USPC .......................................................... 209/204

(58) Field of Classification Search
CPC ................... H04L 29/08072; H04L 29/06027; H04L 12/581; H04L 29/06; G06Q 10/10
USPC .......................................................... 709/204
See application file for complete search history.

(56) References Cited

U.S. PATENT DOCUMENTS

2005/0159998 A1 * 7/2005 Buyukkokten et al. .......... 705/11
2006/0042483 A1 * 3/2006 Work et al. ..................... 101/91

* cited by examiner

*Primary Examiner* — Robert B Harrell
(74) *Attorney, Agent, or Firm* — Fenwick & West LLP (57) ABSTRACT

A user profile for a user of a social networking system may include experiences, such as work, educational, travel, and interests. The social networking system provides a profile page for a user's user profile that allows users to compliment the user on the experience. If a user wants to compliment another user on an experience not present on that user's user profile, the user can add the experience along with the compliment. Complimenting users on their experiences allows a reputation ranking to be created based on compliments received in a particular domain, which are searchable by user of the social networking system. The compliments may be used by the social networking system to build a domain-based reputation ranking of users of a social networking system.

23 Claims, 8 Drawing Sheets

ADDING A COMPLIMENT TO A USER'S EXPERIENCE ON A USER'S SOCIAL NETWORKING PROFILE

BACKGROUND

This invention relates generally to social networking, and in particular to providing a user profile for a user of a social networking system that includes experiences that can serve as the basis for complimenting the user by other users of the social networking system.

Social networking systems have become prevalent in recent years because they provide a useful environment in which users can connect to and communicate with other users. A variety of different types of social networking systems exist that provide mechanisms allowing users to interact within their social networks.

One typical characteristic of social networking systems is that each user has a user profile where the user can provide information about the user's experiences, such as educational experiences, work experiences, and the like. Typically, the information is organized into linear information, intended for viewing only. The user profile information provides few if any items of common information between users, and actions usually cannot be taken upon the experiences themselves. Moreover, richer information about the user experiences, such as other users' opinions about a user's skill level at the experience, professionalism on a job, organization within a project, and the like, are left out.

A few systems provide limited complimenting functionality that allows other users to comment on a user's experience, but these compliments are typically limited to opinions on work from current or previous co-workers in a business setting. Similar complimenting for other experience types, such as activities, hobbies, and interests, to name a few examples, is not available. In addition, existing systems do not provide any measure of reputation for the complimented on the basis of such compliments, nor do they typically allow searching for users who have established a strong reputation in a particular field, category, or domain of experience.

SUMMARY

To enable a social networking system to provide richer experience information viewable by other users and usable by the social networking system, embodiments of the invention provide a mechanism for users to compliment other users in their user profile experiences. Using information maintained in user profiles, user experiences are included in a display of a user profile for a user of a social networking system. A user may add a compliment to an experience on another user's user profile and may add an indication of the relationship between the complimented and complimenting users in the context of the experience. The social networking system provides an interface for complimenting the user experiences. The interface may also enable a complimenting user to add an experience to a user's user profile when the experience that the complimenting user wants to compliment does not exist on that user profile. Complimented users can remove the compliment, and/or the experience that was complimented, if desired.

The compliments may be used by the social networking system to build a domain-based reputation ranking of users of a social networking system. The system may gather compliments for a user within a particular domain, and then determine a reputation ranking for the users based on the compliments within the domain.

Accordingly, embodiments of the invention allow the social networking system to provide a user profile that includes a user's experiences that other users may compliment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of a Social Networking System Architecture

Figure 1:
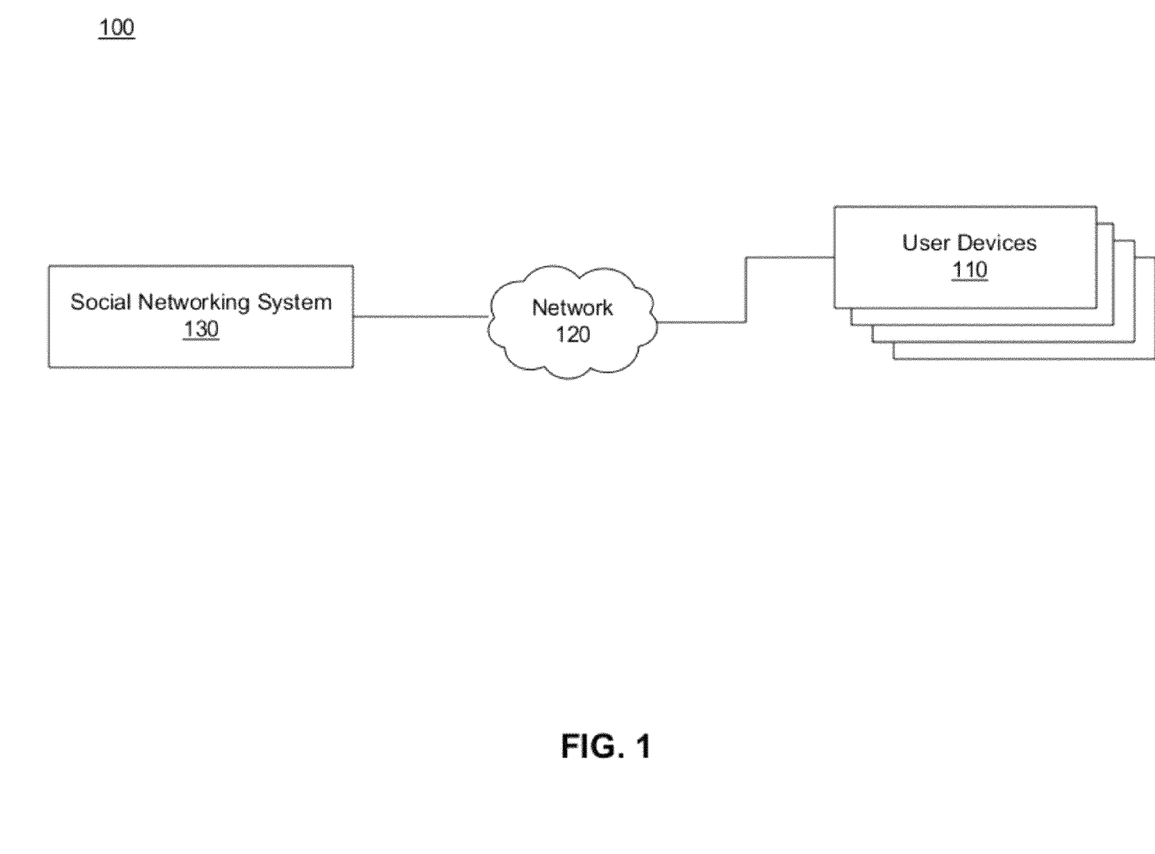
FIG. 1 is a network diagram of one embodiment of a system for complimenting users of a social networking system on their user profile experiences.

FIG. 1 is a network diagram of one embodiment of a system 100 for complimenting users of a social networking system 130 on their user profile experiences. The system 100 includes one or more user devices 110 connected via a network 120 to the social networking system 130. The social networking system 130 provides a platform, or backbone, in one embodiment which other systems may use to provide social networking services and functionalities to users across the Internet.

A user device 110 comprises one or more computing devices that can receive input from a user and can transmit and receive data via the network 120. For example, the user device 110 may be a desktop computer, a laptop computer, a smart phone, a personal digital assistant (PDAs) or any other device including computing functionality and data communication capabilities. The user device 110 is configured to communicate with the social networking system 130 via the network 120, which may comprise any combination of local area and/or wide area networks, using both wired and wireless communication systems. The user device 110 displays content from the social networking system 130.

The social networking system 130 comprises one or more computing devices storing a social network, or a social graph, comprising a plurality of users and providing users of the social network with the ability to communicate and interact with other users of the social network. In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130. Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation. Using a social graph, therefore, a social networking system may keep track of many different types of objects and the interactions and connections among those objects, thereby maintaining an extremely rich store of socially relevant information.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system.

These are just a few examples of the items upon which a user may act on a social networking system, and many others are possible. A user may interact with anything that is capable of being represented in the social networking system 130.

The social networking system 130 is also capable of linking a variety of entities. For example, the social networking system 130 enables users to interact with each other as well as receive content from third-parties.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. The user-added content then also can be the subject of additional user content, e.g., a user can comment on a link or post, "like," a photo, link, or post, and can tag others in a photo. In another example, users may tag other users in experiences on the user profiles as described herein. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Figure 2:
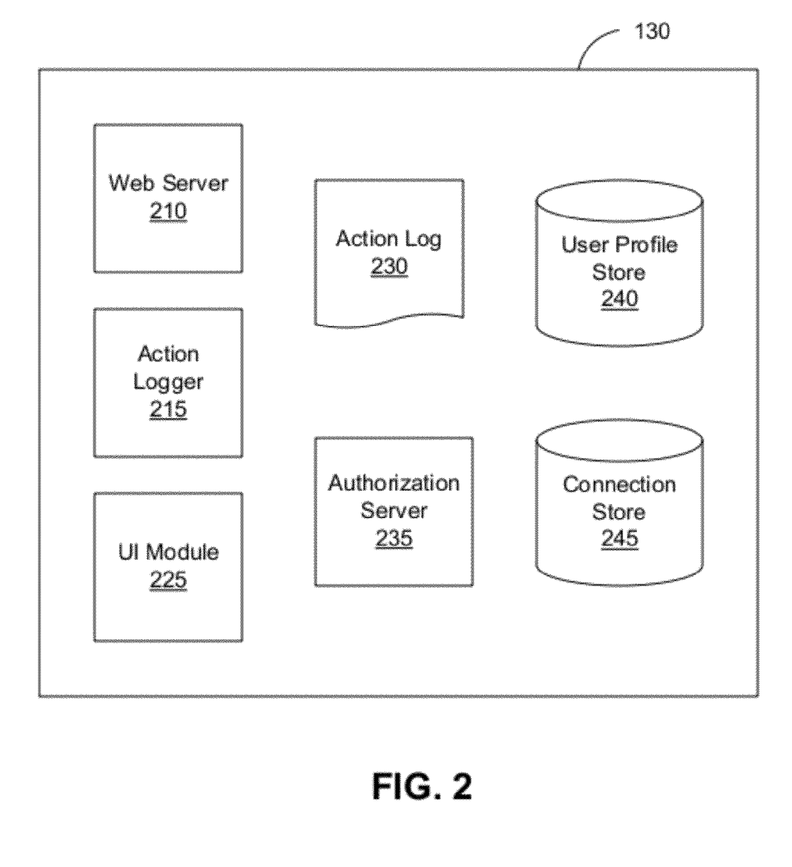
FIG. 2 is a diagram of a social networking system, in accordance with an embodiment of the invention.

FIG. 2 is a diagram of one embodiment of a social networking system 130, which is implemented as a website according to one embodiment. In other embodiments, the social networking system 130 may provide social networking functionalities for other types of systems, such as native applications that run on the user devices 110. The embodiment of a social networking website 130 shown by FIG. 2 includes a web server 210, an action logger 215, a user interface module 225, an action log 230, an authorization module 235, a user profile store 240, and a connection store 245. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

The web server 210 links the social networking system to one or more user devices 110 via the network 120. The web server 210 serves web pages, as well as other web-related content, such as Java, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

As described above in conjunction with FIG. 1, the social networking system 130 comprises a computing system that allows users to communicate or otherwise interact with each other and access content as described herein. The social networking system 130 stores user profiles describing the users of a social network in a user profile store 240. The user profiles include biographic, demographic, and other types of descriptive information. The user profile store 240 includes various information about user experiences in various categories, e.g., educational experiences, experiences, travel experiences, activity experiences, etc. The user profile store 240 may include all the experience information described herein, including information about the various domains for the user's experiences, users who have complimented the user on his experiences, and other users who the user have provided compliments for, and a reputation ranking for the user.

The user profile store 240 contains data structures with fields suitable for describing a user's profile. When a new object of a particular type is created, the social networking system 130 initializes a new data structure, i.e., a "node" of the corresponding type, assigns a unique object identifier to it, and begins to add data to the object as needed. This might occur, for example, when a user becomes a user of the social networking system 130, the social networking system 130 generates a new instance of a user profile in the user profile store 240, assigns a unique identifier to the user profile, and begins to populate the fields of the user profile with information provided by the user.

In addition, the user profile store 240 may include data structures suitable for describing a user's demographic data, behavioral data, and other social data. Demographic data typically includes data about the user, such as age, gender, location, etc., e.g., as included in the user's profile. Behavioral data typically includes information about the user's activities within the social networking system 130, such as specific actions (posts, likes, comments, etc.), activity levels, usage statistics, etc. Other social data comprises information about the user from within the social networking system 130 that is not strictly demographic or behavioral, such as interests or affinities, etc.

In addition, the user profile store 240 may be accessed by other aspects of the social networking system 130, e.g., the user interface module 225 for creating and updating a user profile and its functionality as described herein. The user profile store 240 may be updated such that the user profile includes compliments on experiences added by other users, either to existing experiences or added in conjunction with the addition of an experience.

In use, information about new experiences or compliments on the experience added via a user interface is received at the user profile store 240 from the user interface module 225. When a new compliment is added, for example via one user adding a compliment about a user based on an existing experience, the social networking system 130 finds the node for the experience and adds the data regarding the compliment. For a compliment on a new experience, the social networking system 130 initializes a new node corresponding to the experience, assigns a unique object identifier to it, and begins to add data, including the compliment information, to the experience object as needed. A compliment association is created between the complimented user, the experience, and the complimenting user. In addition, an attribution association is added if it was the complimenting user who added the experience to the user's user profile rather than the complimented user himself. The user profile store 240 stores these objects and associations in the context of the complimented user and complimenting user's respective user profiles.

The social networking system 130 further stores data describing one or more connections between different users in a user connection store 245. The connection information may indicate users who have similar or shared affinities such as work experience, group memberships, hobbies, educational history, or are in any way related or share common attributes. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. The connection store 245 includes data structures suitable for describing a user's connections to other users, connections to third-party content object providers 120, or connections to other entities. The connection stores 245 may also associate a connection type with a user's connections, which may be used in conjunction with the user's privacy setting, to regulate access to information about the user. In addition, the connection store 245 may be accessed by other aspects of the social networking system 130, e.g., the user interface module 225 for providing a list of relationship types in a drop down for complimenting on an experience, or may be used to auto-populate the relationship between the complimenting and complimented users.

The user interface module 225 is configured to provide a user interface for displaying to a viewer a user profile including various experiences. Data stored in the connection store 245, the user profile store 240, and the action log 230 allows the user interface module 225 access to information for creating the user profiles. The user interface module 225 may display experiences grouped by various categories and/or domains, and may show a hierarchy of experiences. The user interface module 225 provides information about newly added compliments on experiences to the action logger 215 and log 230 and to the user profile store 240 to include the added compliments in the user's user profile. The user interface module 225 provides the functionality described in conjunction with the compliments screen shots shown in FIGS. 4A-4D according to one embodiment.

The action logger 215 is capable of receiving communications from the web server 210 about user actions on and/or off the social networking system 130. The action logger 215 populates the action log 230 with information about user actions, allowing the social networking system 130 to track various actions taken by its users within the social networking system 130 and outside of the social networking system 130. Any action that a particular user takes with respect to another user is associated with each user's profile, through information maintained in the action log 230 or in a similar database or other data repository. Examples of actions taken by a user within the social network 130 that are identified and stored may include, for example, adding a connection to another user, sending a message to another user, reading a message from another user, viewing content associated with another user, attending an event posted by another user, tagging another user in an experience, being tagged by another user in an experience, complimenting a user on an experience, or other actions interacting with another user. When a user takes an action within the social networking system 130, the action is recorded in an action log 230. The action log 230 may include a history of actions even if the actions are no longer current.

When an action is taken within the social networking system 130, an entry for the action is added to the action log 230. In addition, the action logger 215 may transmit communications in addition to receiving them according to one embodiment. When a new compliment is added to an experience not present in a user profile for the complimented user, the action logger 215 adds the associated experience to the user profile if not previously stored as such in the user profile store 240. In addition, the action logger 215 may transmit a notification to the user via various channels according to some embodiments. Notifications may be sent via notification on the social networking system 130 pages, e-mail notification, or an SMS message on a mobile device, for example. Likewise, when a compliment is removed from an experience (or the entire experience removed), the action logger 215 tracks it and updates the user profile store 240 accordingly.

The authorization server 235 enforces one or more privacy settings of the users of the social networking system 130. A privacy setting of a user determines how particular information associated with a user can be shared.

Complimenting Users in User Profile Experiences

In one embodiment, the social networking system 130 provides a mechanism for complimenting users in user profile experiences. As used herein, the term "user profile experiences" includes all experiences that can be included in a user's user profile. A non-exclusive list of user profile experiences types, with examples, includes work experiences (e.g., positions, projects, etc.), educational experiences (e.g., schools, activities, clubs, associations, position held within a club or association, majors, minors, specific colleges/programs within a university, etc.), activity experiences (e.g., running, cooking, reading, travel, yoga, taking BART, sports, etc.), and interest experiences (e.g., musicians/groups, such as Gwen Stefani; food/beverage retailer, such as Starbuck's Coffee; authors, such as Barbara Kingsolver books; television shows, such as Mad Men; lifestyles, such as eating raw; annual events, such as Austin City Limits; associations/societies/clubs, such as National Association of Women Lawyers; movements, such as Pay It Forward Day; movies, such as High Fidelity; events, such as Sacramento Clean Tech Showcase; art genres, such as photography; particular retail products/categories, such as Cannon cameras; places, such as Monterey Bay Aquarium; causes, such as breast cancer awareness; etc.).

As used herein, "complimenting" means providing a positive statement about the user's experience. In other embodiments, comments can be added more generally, e.g., reflecting more negative sentiment, neutral sentiment, etc. According to one embodiment the social networking system 130 determines whether a compliment added by a user is in fact a positive statement rather than a negative one. In one embodiment, when a user is complimented on an experience in the user's user profile, the user's user profile is updated to show the compliment as associated with that experience.

Figure 3:
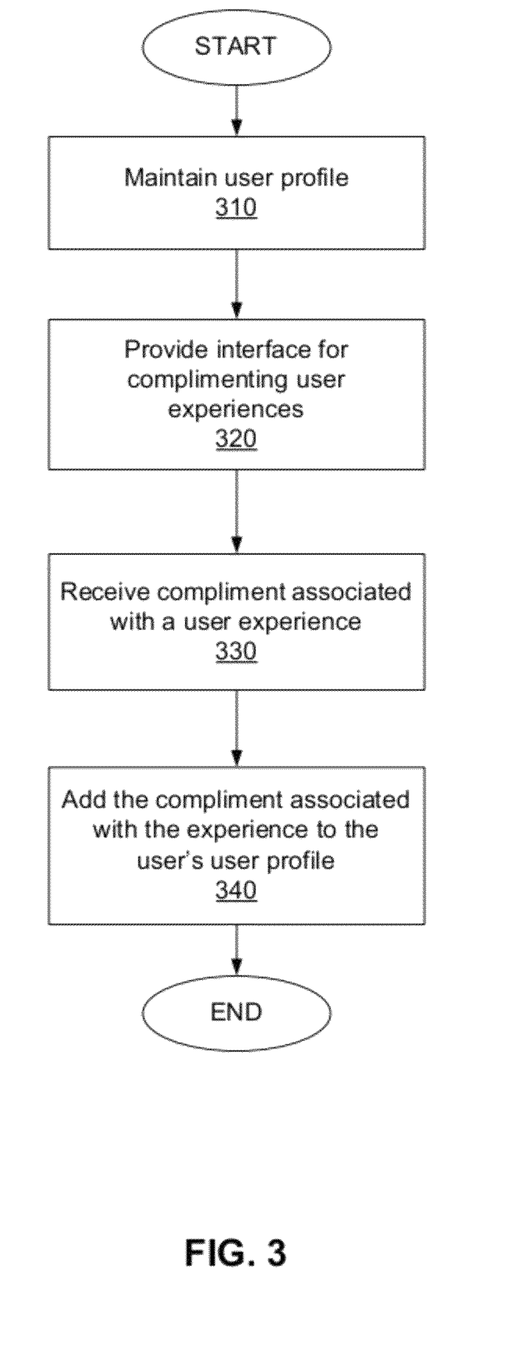
FIG. 3 is a flowchart showing one embodiment of a method for complimenting users of a social networking system.

FIG. 3 is a flowchart showing one embodiment of a method for complimenting users in user profile experiences. Initially, user profiles are maintained 310 by the social networking system 130. The user profile includes various categories, or domains, of user experiences, including the various types indicated above.

The social networking system 130 provides 320 an interface for a user who wishes to provide a compliment for another user related to an experience on that user's user profile. The social networking system 130 receives 330 a compliment from the complimenting user about the user whose profile the complimenting user with respect to a user's experience listed on the user profile. For example, the user may add a compliment to an educational experience indicating that the user had very good study habits. Compliments are received via input by the complimenting user into the interface, e.g., via a text field or the like. Examples of interfaces for adding compliments are shown in FIGS. 4B-D.

In one embodiment, when a user compliments a user experience of another user, the social networking system may look up one or more connection types between the user being complimented ("complimentee") and the complimenting user for the experience. For example, as the user types, a drop down list may appear with connection types for an experience (e.g., co-worker, supervisor, and report for a work experience, and classmate, professor, and teaching assistant for an educational experience). See FIG. 4D, reference numeral 495, for an example of such a dropdown. The social networking system 130 may auto-populate the connection type between the users if it is already known, e.g., by an indication in the user profile store 240, such as that one user is the supervisor of the other user.

Once the compliment is received 330 from the user, it is included 340 on the user's user profile as associated with the experience. For example, a compliment indicator is incremented (or added if the compliment is the first one on that experience) in response to the addition of a compliment, e.g., see reference numeral 420 on FIG. 4A. To see the compliment, the view can click the compliment control, shown as reference numeral 425 on FIG. 4A, which will then display a compliments window 435 as shown in FIG. 4B. The social networking system 130 also stores the compliments with the complimented user's profile to help formulate a reputation for the user in the domain associated with the complimented experience, and/or to establish a reputation ranking among users for experiences in the domain. As described further below, e.g., if a user receives a bunch of compliments on the user's cooking, the social networking system 130 may store a reputation ranking that indicates a skill level in that experience domain (i.e., cooking). The effect of a compliment on a user's score in a particular domain may be based on the complimenting user's own expertise (i.e., the user's own reputation ranking) in that same domain.

If the user whom the complimenting user wants to compliment does not have the experience listed on his user profile, the experience also is added to the user's user profile as discussed in conjunction with FIG. 4 below. In one embodiment, if the compliment causes an experience to be added to the user's user profile in this manner, an attribution is stored indicating that the complimenting user caused the experience to be added to the user's user profile (i.e., rather than the user adding it himself). In some embodiments, such compliments may require acceptance by the complimented user before adding the compliment and experience to the user's user profile. For example, the social networking system 130 may send a confirmation to the complimented user (e.g., via the notification process below), and may require the user to accept the compliment before posting it to the user's profile. Alternatively, the compliment may initially be posted to the complimented user's profile unless removed by the complimented user.

The social networking system 130 may also send a notification to the complimented user that he has received a compliment on the experience. The notification may be communicated via a variety of communication channels, including notification on the social networking system 130 pages, e-mail notification, or an SMS message on a mobile device, for example. Other notification channels also are possible in various embodiments. New compliments on experiences also may appear in news feeds for connections of the complimented user according to some embodiments. Thus, the complimenting functionality enhances the interactions between users of the social networking system 130, which enhances the social graph and creates stronger affinities between users.

The social networking system 130 may also provide a mechanism for users to remove compliments, and associated experiences when those are added with the compliments, that are incorrect or otherwise undesired. A complimented user may request removal of a compliment. In response, the social networking system 130 removes the compliment from the experience on the user profile, as well as removes the experience from the user's user profile, if desired.

Figure 4A:
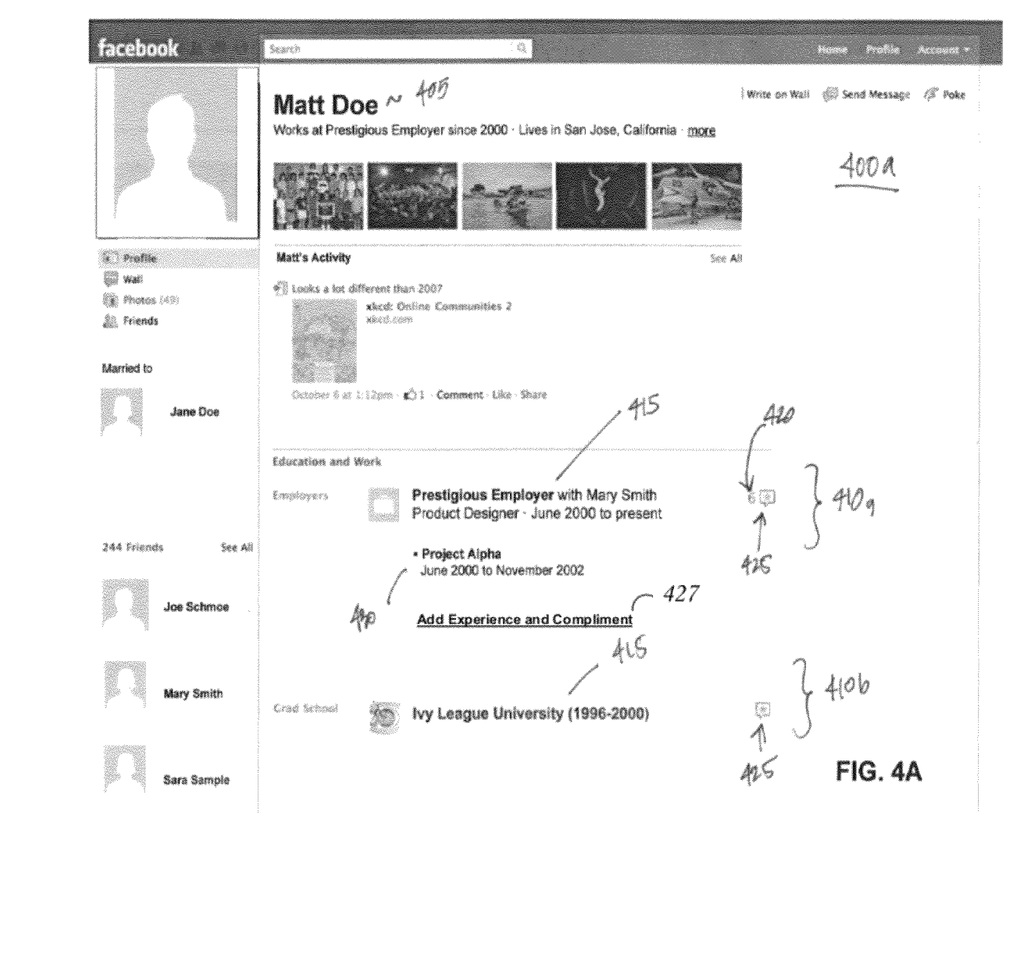
FIGS. 4A-4D are embodiments of social networking system user profile screens showing experiences for a user and receiving compliments for those experiences.
Figure 4B:
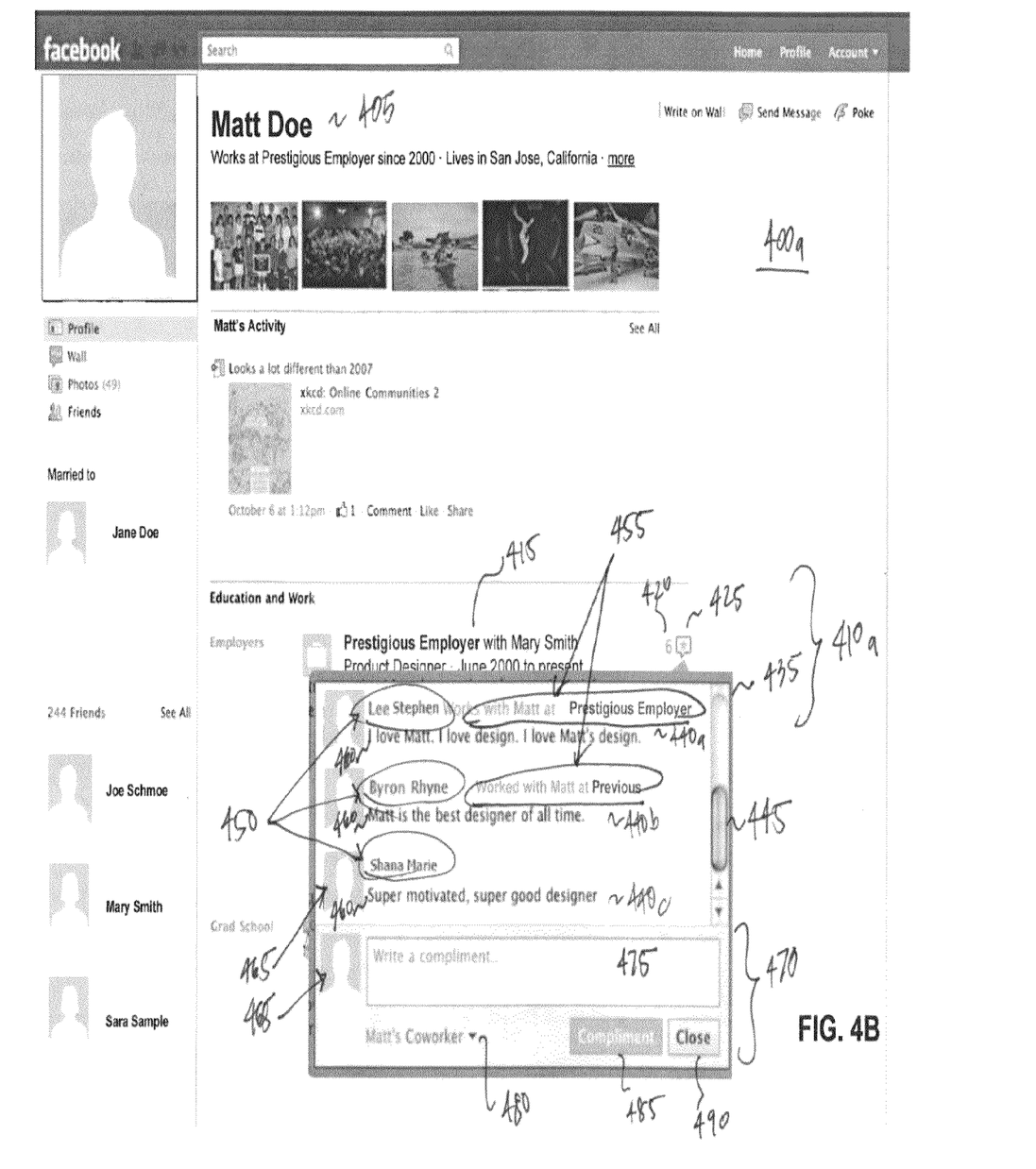
Figure 4C:
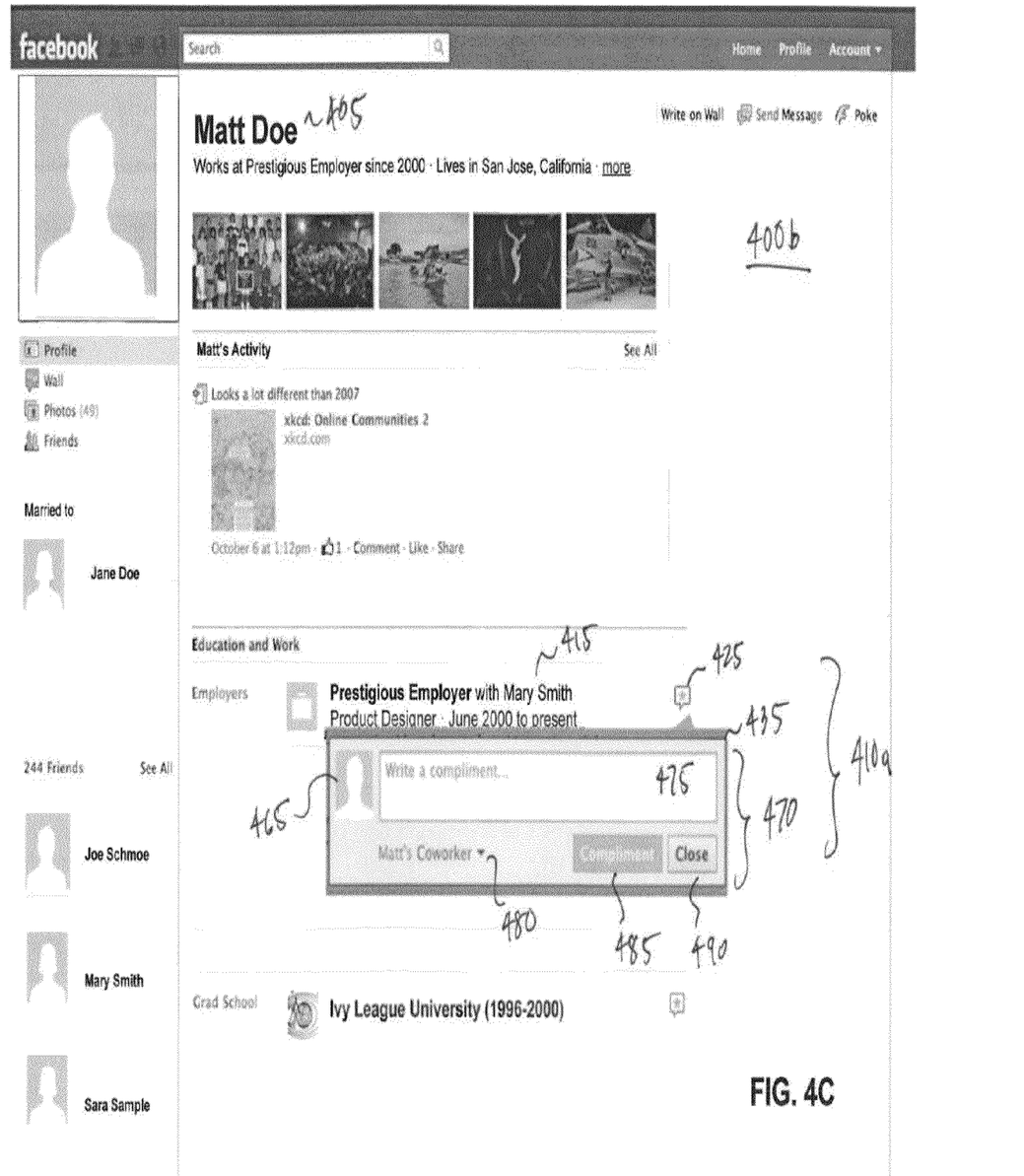
Figure 4D:
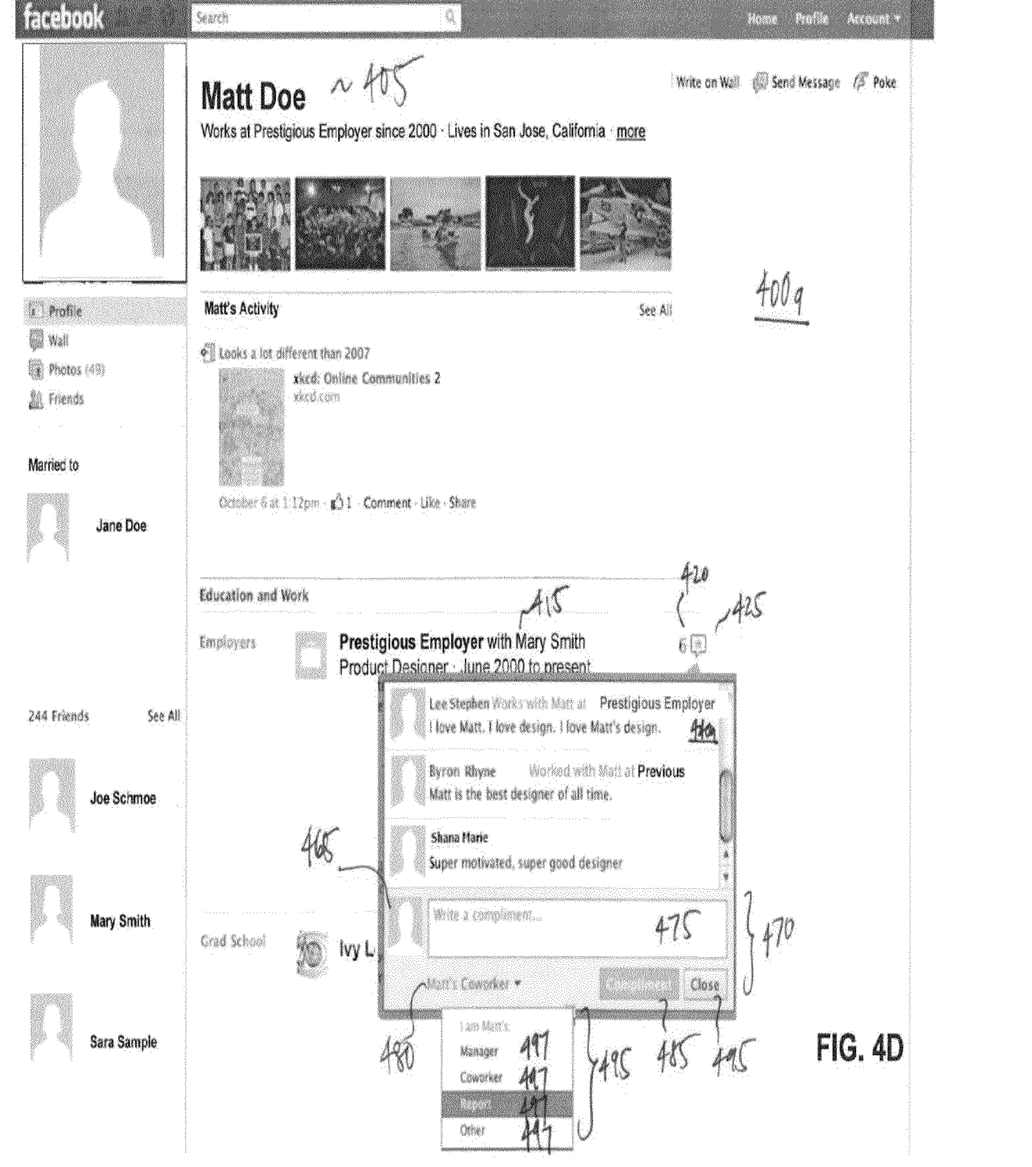

Referring again to FIG. 3 in conjunction with FIGS. 4A-4D, implementation of the method is shown. FIG. 4A is one embodiment of a screenshot of a social networking system user profile 400a showing compliments on experiences for user John Doe 405. In this example, two experiences are shown, Prestigious Employer 410a and Ivy League University 410b. In other examples, a different number and/or types of items may be shown. These are the experiences maintained 310 as part of the user's user profile.

In this example, each experience 410 shows an experience name (Prestigious Employer, Ivy League University) 415 and a compliment control 425. Experience 410a has 6 compliments, as shown by compliment indicator 420, but experience 410b does not have any compliments, so no compliment indicator 420 is shown for experience 410b. In other examples, compliment indicators 420 and controls 425 can be shown for nested experiences as well, such as Project Alpha 430 under Prestigious Employer 415. Viewer selection of the compliment control 425 triggers display of a compliments window 435 as shown in FIG. 4B. In one embodiment, a compliment can be added along with a new experience not shown on the user's user profile 400a, using an add experience and compliment control 427. Selection of this control 427 allows addition of a new experience, along with the compliment information (e.g., text and relationship type).

FIG. 4B is an embodiment of a screenshot of a social networking system user profile 400a of FIG. 4A showing a compliments window 435, by which the social networking system 130 provides 320 an interface for complimenting user experiences. In this example, the compliments window is for experience 410a, triggered by user selection of compliment control 425, and thus shows the compliments associated with that experience 410a. Compliment indicator 420 shows six compliments; three of these compliments 440a-c are shown in the compliments window 435. A scroll bar 445 can be moved to see the others of the six compliments 440. Each compliment 440 provides the name of the complimenting user 450, optionally how the complimenting user is connected to the user with respect to the compliment 455 (e.g., currently works with, previously worked with, etc.), and the compliment text 460. A profile picture 465 of the complimenting user 450 also may be shown, and the connection information 455 may be left off of some compliments 440, e.g., as shown for compliment 440c by Shana Marie.

In addition, the compliments window 435 provides an add compliment section 470. The add compliment section 470 includes a field 475 for a user adding, and the social networking system 130 receiving 330, a compliment as associated with the experience. The add compliment section 470 also includes a connection selection control 480, and controls for adding the compliment, via the compliment button 485, and closing the compliments window 435, via close button 490. The add compliment section 470 also may include a profile picture 465 of the complimenting user 450. In an example in which no compliments exist for an experience, the add compliment section 470 makes up the entire compliments window 435, as no compliments 440 are included. FIG. 4C shows an embodiment of a screenshot of a social networking system user profile 400b showing a compliments window 435 with only an add compliment section 470, as no compliment indicator 420 is visible in this example. After selection of the add compliment button 485, the compliment is added 340 to the user's user profile by the social networking system 130.

Referring again to FIG. 4B, the connection selection control 480 activates a connection type drop down 495 according to one embodiment, as shown in FIG. 4D. FIG. 4D is an embodiment of a screenshot of a social networking system user profile 400a of FIG. 4A showing a compliments window 435 with a connection type drop down 495. The connection type drop down 495 provides various types 497 of connections as options for selection by the complimenting user. Selection of a type 497 populates the connection selection control 480 with the selected type. In one example, selection of "Other" allows the complimenting user to add custom connection type text. In another example, the connection selection control 480 may be populated by the social networking system 130 with a connection type if that information already is known to the system e.g., as stored in user profile store 240.

In the above example, it has been assumed that one user (the "complimenting user") is adding a compliment to the user profile of another user (the "complimentee") for an existing experience on the complimentee's user profile. However, in one embodiment, a complimenting user can also add a compliment to a complimentee's page even if the experience for which the complimenting user wants to provide a compliment does not exist on the complimentee's page. To do so, the complimenting user activates a control to add both the compliment and the associated experience to the complimentee's user profile. Once added in this manner, the new experience is added to the complimentee's profile, along with the compliment itself, and the experience is attributed to the complimenting user (and annotated by the system as such). Alternatively, the complimenting user adds the compliment to the desired experience on his own profile and associates it with the complimentee, using a similar add compliment window as shown in FIGS. 4B-D.

Figure 5:
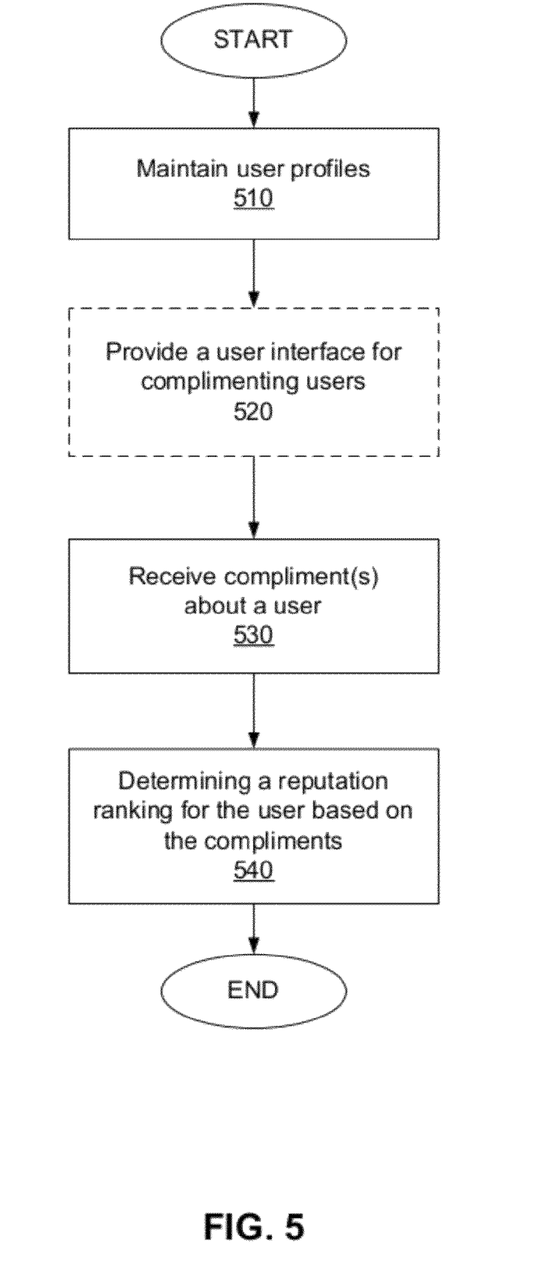
FIG. 5 is a flowchart showing one embodiment of a method for building a domain-based reputation ranking of users of a social networking system.

FIG. 5 is a flowchart showing one embodiment of a method for building a domain-based reputation ranking of users of a social networking system 130. Initially, user profiles are maintained 510 by the social networking system 130. The user profile includes various categories, or "domains," of user experiences, including the various types indicated above. Domains may be defined by various subject areas, interests, activities, skill sets, etc. within a user's experiences, e.g., cooking, engine repair, code writing, critical analysis of literature, etc., and may vary as to the breadth of the domain. In addition, domains may be nested, e.g., cooking may be a broad domain that includes gourmet cooking, Italian cooking, cooking light, etc. as sub-domains, to name a few examples.

The social networking system 130 optionally provides 520 an interface for users to add compliments to experiences on user's user profiles, as described herein. The social networking system 130 receives 530 one or more compliments about a user via the interface, e.g., as discussed in conjunction with FIGS. 4A-4D herein, or may receive the compliments via a mobile device or other means for accessing the social networking system 130.

The social networking system 130 determines 540 a reputation ranking for the user based on the compliments received. The reputation ranking may be domain specific. For example, for interests-type experiences, the reputation ranking may be specific to the interest (e.g., cooking, running, etc.), for work-type experiences, the reputation ranking may be based on a category of the employer or of the project (e.g., the social networking system 130 may have information indicating that the employer is a law firm, a tech company, etc.) or may be based on the user's position at the employer (e.g., CEO, HR, engineer, attorney, etc.), etc. The reputation ranking is based at least in part on compliments provided by other users on the experiences of users that are within the domain. The social networking system 130 maintains a reputation ranking for a user in the user's user profile information for any user who has received at least one compliment on the experience or within the domain of the experience, according to one implementation. The ranking may be kept for each of multiple domains if the user has been complimented in on different experience types. When a user receives a compliment for a particular experience, that experience is mapped to a domain associated with the experience, and the user's reputation ranking for that domain is then adjusted (i.e., increased) based on the compliment. The increase could be affected by the complimenting user's reputation ranking in the same domain. The result is a set of reputation scores that allow the social networking system 130 to track the user's reputation in a number of different domains.

Thus, a user may have multiple reputation rankings due to having been complimented in multiple domains. In some embodiments, the reputation ranking for a complimenting user is taken into consideration for the reputation ranking for the user receiving the compliment. For example, a compliment on a user's skill at glass blowing by a glass blower with numerous compliments, and thus a high reputation ranking with respect to glass bowing, will provide a greater increase in the complimented user's reputation ranking than a compliment from a user who has received no compliments related to glass blowing himself, but likes the complimented user's work. The reputation rankings may be searchable according to one embodiment, e.g., by a user who wants to find the best cooks among his connections, or even among other social networking system 130 users willing to make such information available to a broader group than just first degree connections. Alternatively, users may be directed to content in a domain of interest based on indication of the user's interest in the domain.

Thus, the complimenting functionality enhances the interactions between users of the social networking system 130 and provides additional bases on which users can connect. These interactions enhance the social graph and create stronger ties between users, and provide the social networking system 130 greater breadth and depth of information about the user's experiences and capabilities with experiences and/or particular domains, which enables the social networking system 130 to leverage the user's expertise to help other users (e.g., by indicating a high reputation ranking for a particular domain such that the user is a domain expert). In addition, the reputation ranking can be used in additional ways, for example when a question is posted by a user and the question pertains to a particular domain, the question may be directed to users with a high reputation ranking in the domain. As another example, the reputation ranking may be used as a way to determine which wall posts, comments, etc. to display more prominently on various pages, feeds, etc., e.g., those posts, comments, etc. contributed by users with high reputation rankings in one or more domains.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
maintaining, by a social networking system, a user profile for a first user of the social networking system, wherein the user profile of the first user is associated with one or more nodes corresponding to one or more user experiences of the first user;
providing, by the social networking system, a profile page of the first user, the profile page including an itemized list of the one or more user experiences associated with the user profile of the first user;
providing, by the social networking system, an interface for a second user of the social networking system to compliment the first user on one or more of the user experiences displayed in the itemized list, by enabling the second user to provide descriptive statements elaborating on items in the itemized list;
providing, by the social networking system, an experience and compliment control on the interface to add an additional user experience to the itemized list of the first user that is not;
receiving from the second user, via the experience and compliment control on the interface, an additional user experience for the first user;
associating, by the social networking system, an additional node corresponding to the additional user experience with the user profile of the first user; and
adding, by the social networking system, the additional user experience to the itemized list of user experiences on the first user's user profile.

2. The computer-implemented method of claim 1, further comprising:
associating, by the social networking system, the additional user experience with relationship type between the first user and the second user.

3. The computer-implemented method of claim 2, wherein the relationship type between the first user and the second user in context with the additional user experience is provided by the second user.

4. The computer-implemented method of claim 2, further comprising:
providing, by the social networking system, to the second user, a list of relationship types from which to select a relationship type in conjunction with the additional user experience;

receiving a selection of a particular relationship type by the second user from the list of relationship types to associate with the additional user experience; and associating, by the social networking system, the relationship type between the first user and the second user in conjunction with the additional user experience.

5. The computer-implemented method of claim 2, further comprising:

maintaining relationship information between the first and second users; and automatically associating, by the social networking system, the relationship type with the additional user experience based on the relationship information between the first and second users.

6. The computer-implemented method of claim 1, further comprising:

receiving, from the second user, via the experience and compliment control on the interface, a descriptive compliment elaborating on the additional user experience; and providing, by the social networking system, a notification to the first user that the first user was complimented on the additional user experience and that the additional user experience and the descriptive compliment were added to the first user's user profile.

7. The computer-implemented method of claim 6, wherein the notification causes a delay to adding the descriptive compliment associated with the additional user experience to the first user's user profile pending approval by the first user.

8. The computer-implemented method of claim 1, further comprising:

receiving, from the second user, via the experience and compliment control on the interface, a descriptive compliment and elaborating on the additional user experience; and determining, by the social networking system, a reputation ranking for the first user based at least in part on the descriptive compliment received from the second user on the additional user experience.

9. The computer-implemented method of claim 8, wherein the reputation ranking is specific to a domain associated with the additional user experience.

10. The computer-implemented method of claim 1, wherein the user experience is a social networking object displayed in a user's user profile.

11. The computer-implemented method of claim 10, wherein the social networking system tracks user interactions with the user experience object.

12. The computer-implemented method of claim 1, wherein the additional user experience is received on the second user's user profile.

13. The computer-implemented method of claim 1, wherein the additional user experience is received on the first user's user profile.

14. The computer-implemented method of claim 1, further comprising storing an attribution indicating that the second user caused the additional user experience to be added to the first user's user profile.

15. The computer-implemented method of claim 1, further comprising providing for display, by the social networking system, to a viewing user a page including the updated first user's user profile, the page including the additional user experience.

16. The computer-implemented method of claim 1, further comprising:

receiving a request from the first user to remove the descriptive compliment from the first user's user profile; and responsive to receiving the request, removing the descriptive compliment from the first user's user profile by the social networking system.

17. The computer-implemented method of claim 1, further comprising:

receiving, by the social networking system, from the second user a selection to display compliments associated with the additional user experience;

providing, by the social networking system, a list of compliments for display on the first user's user profile in response to the second user's selection.

18. The computer-implemented method of claim 1, wherein an item in the itemized list of user experiences comprises a caption summarizing an activity, interest, or accomplishment of the first user.

19. A computer-implemented method for determining a reputation ranking, comprising:

maintaining, by a social networking system, a user profile for each of a plurality of users of a social networking system, the user profile including compliments associated with user experiences;

receiving, by the social networking system, one or more compliments from other users of the social networking system about a first user in context with a selected one of the user experiences on the first user's user profile;

determining, by the social networking system, a reputation ranking for the first user based at least in part on the one or more compliments received about the first user for the selected user experience, wherein the reputation ranking is specific to a particular domain associated with the selected user experience, the particular domain representing a class of user experiences that share a similar characteristic; and in response to receiving a new compliment associated with the selected experience within the particular domain from a second user about the first user, increasing the reputation ranking for the first user in the particular domain by an amount that varies based on a reputation ranking of the second user in the particular domain.

20. The computer-implemented method of claim 19, further comprising:

determining, by the social networking system, a list of users for the domain sorted by the reputation rankings associated with each of the users in the list of users.

21. The computer-implemented method of claim 20, further comprising:

providing, by the social networking system, an interface for the plurality of users to search for users within a domain with high reputation rankings.

22. The computer-implemented method of claim 20, further comprising:

providing, by the social networking system, an interface for the plurality of users to indicate a domain of interest for directing one or more users to content in that domain.

23. The computer-implemented method of claim 19, further comprising:

providing, by the social networking system, an interface for the other users of the social networking system to compliment the first user on the user experiences on the first user's user profile.

* * * * *

UNITED STATES PATENT AND TRADEMARK OFFICE
CERTIFICATE OF CORRECTION

PATENT NO. : 8,978,893 B2
APPLICATION NO. : 12/980226
DATED : March 17, 2015
INVENTOR(S) : Peter Xiu Deng et al.

It is certified that error appears in the above-identified patent and that said Letters Patent is hereby corrected as shown below:

Column 12, line 43, claim 1, after "not;" insert -- in the itemized list; --.

Signed and Sealed this
Fifteenth Day of March, 2016

Michelle K. Lee
*Director of the United States Patent and Trademark Office*